United States Patent
Rajendran et al.

(10) Patent No.: US 11,630,928 B2
(45) Date of Patent: Apr. 18, 2023

(54) SYSTEM AND METHOD TO BUILD AND SCORE PREDICTIVE MODEL FOR NUMERICAL ATTRIBUTES

(71) Applicant: Marlabs Innovations Private Limited, Bengaluru (IN)

(72) Inventors: Senthil Nathan Rajendran, Bangalore (IN); Selvarajan Kandasamy, Bengaluru (IN); Tejas Gowda Bk, Bangalore (IN)

(73) Assignee: MARLABS INCORPORATED

( * ) Notice: Subject to any disclaimer, the term of this patent is extended or adjusted under 35 U.S.C. 154(b) by 423 days.

(21) Appl. No.: 16/530,029

(22) Filed: Aug. 2, 2019

(65) Prior Publication Data

US 2020/0082040 A1 Mar. 12, 2020

(30) Foreign Application Priority Data

Sep. 6, 2018 (IN) .............................. 201841033595

(51) Int. Cl.
G06F 30/20 (2020.01)
G06F 111/10 (2020.01)

(52) U.S. Cl.
CPC .......... *G06F 30/20* (2020.01); *G06F 2111/10* (2020.01)

(58) Field of Classification Search
CPC .. G06F 30/20; G06F 2111/10; G06F 2111/08; G06F 30/27
See application file for complete search history.

(56) References Cited

U.S. PATENT DOCUMENTS

| | | |
|---|---|---|
| 9,286,290 B2 | 3/2016 | Allen et al. |
| 9,378,270 B2 | 6/2016 | Sekar |

(Continued)

FOREIGN PATENT DOCUMENTS

CN 107077489 A 8/2017

OTHER PUBLICATIONS

Alon, Ilan, Min Qi, and Robert J. Sadowski. "Forecasting aggregate retail sales:: a comparison of artificial neural networks and traditional methods." Journal of retailing and consumer services 8, No. 3 (2001): 147-156 (Year: 2001).*

(Continued)

*Primary Examiner* — Steven W Crabb
(74) *Attorney, Agent, or Firm* — Jason C. Cameron

(57) ABSTRACT

System and method to build and score predictive model for numerical attributes are provided. The system includes a memory and a processing subsystem. The processing subsystem is configured to select one or more numerical variables from the plurality of data sets based on a plurality of parameters, to apply feature engineering and transformation on the one or more numerical variables, to perform time series forecasting on the one or more numerical variables based on the plurality of features extracted, to evaluate and select appropriate prediction technique based a regression technique based on a plurality of elements, to build a prediction model, to score the built prediction model based on the performed time series forecasting and an evaluated regression technique and to predict the built prediction model based on an obtained score. Further, the system uses the plurality of parameters and the prediction method to score and predict the prediction model.

4 Claims, 4 Drawing Sheets

(56) References Cited

U.S. PATENT DOCUMENTS

| | | | |
|---|---|---|---|
| 11,281,969 B1* | 3/2022 | Rangapuram | G06K 9/6256 |
| 2015/0088606 A1* | 3/2015 | Tyagi | G06Q 30/0202 |
| | | | 705/7.31 |
| 2016/0019267 A1 | 1/2016 | Kala et al. | |
| 2017/0177559 A1 | 6/2017 | Dang et al. | |
| 2017/0364851 A1* | 12/2017 | Maheshwari | G06Q 10/06315 |
| 2018/0150783 A1* | 5/2018 | Xu | G06N 20/00 |
| 2019/0197361 A1* | 6/2019 | Rajendran | G06N 20/00 |
| 2020/0097810 A1* | 3/2020 | Hetherington | G06N 3/0454 |

OTHER PUBLICATIONS

Wang, Xiaozhe, Kate Smith-Miles, and Rob Hyndman. "Rule induction for forecasting method selection: Meta-learning the characteristics of univariate time series." Neurocomputing 72, No. 10-12 (2009): 2581-2594 (Year: 2009).*

Newbold, Paul, and Clive WJ Granger. "Experience with forecasting univariate time series and the combination of forecasts." Journal of the Royal Statistical Society: Series A (General) 137, No. 2 (1974): 131-146 (Year: 1974).*

Shang, Han Lin. "Functional time series forecasting with dynamic updating: An application to intraday particulate matter concentration." Econometrics and Statistics 1 (2017): 184-200 (Year: 2017).*

* cited by examiner

SYSTEM AND METHOD TO BUILD AND SCORE PREDICTIVE MODEL FOR NUMERICAL ATTRIBUTES

CROSS-REFERENCE TO RELATED APPLICATION

This application claims the benefit of complete patent application having Patent Application No. 201841033595 filed on Sep. 6, 2018 in India.

FIELD OF INVENTION

Embodiments of the present disclosure relate to development of predictive models, and more particularly to system and method to build and score predictive model for numerical attributes.

BACKGROUND

A predictive model is an abstract model that organises elements of input data and standardises how they relate to one another and to properties of real world entities. Building predictive model is a process that used data mining, data pre-processing, feature engineering, statistical modeling and machine learning to estimate the future values of the chosen target variable.

In one approach, the system which uses time series as a parameter to predict the data includes an acquisition module which acquires data from one or more sources based on time-series. Further, the system determines a time interval for the obtained time series data. Further, the system determines a testing data to predict the data. Based on the data acquired, the set time interval, the testing data and one or more features, the system predicts the data in a set time series. However, the one or more sources used to acquire the data does not include an external source. Also, the one or more features used for predicting the time series data does not include use case, statistical influence and other related sources which reduces the efficiency of predicting the data. Also, the system uses a special set of instructions to predict the data which makes the system complex. Further, as the system requires a user to configure the special set of instructions, the system becomes slow and less efficient.

Hence, there is a need for an improved system and method to build and score predictive model for numerical attributes to address the aforementioned issue.

BRIEF DESCRIPTION

In accordance with one embodiment of the disclosure, a system to build and score predictive model for numerical attributes is provided. The system includes a memory. The memory is configured to store a plurality of data sets acquired from one or more sources. The system also includes a processing subsystem operatively coupled to the memory. The processing subsystem is configured to select one or more numerical variables from the plurality of data sets based on a plurality of parameters, wherein the plurality of parameters includes at least one of a use case, a statistical influence and a previous predictive sample. The processing subsystem is also configured to apply feature engineering and transformation on the one or more numerical variables to extract a plurality of features from the plurality of data sets. The processing subsystem is also configured to perform one of a time series forecasting and a regression technique on the one or more numerical variables based on the plurality of features extracted. Performing one of the time series forecasting and the regression technique on the one or more numerical variables includes performing the time series forecasting on the one or more numerical variables when the one or more numerical variables of the one or more numerical variables are in said time series; running a regression technique on the one or more numerical variables when the one or more numerical variables are not in said time series. The processing subsystem is also configured to evaluate and select appropriate prediction technique using a regression technique based on a plurality of elements. The processing subsystem is also configured to build a prediction model based on chosen prediction technique using one of the time series forecasting and the regression technique. The processing subsystem is also configured to score the prediction model based on performed one of the time series forecasting and the regression technique. The processing subsystem is also configured to predict the prediction model based on an obtained score.

In accordance with another embodiment, a method for building and scoring predictive model for numerical attributes is provided. The method includes acquiring a plurality of data sets from one or more sources. The method also includes selecting one or more numerical variables from the plurality of data sets based on a plurality of parameters, wherein the plurality of parameters comprises at least one of a use case, a statistical influence and a previous predictive sample. The method also includes applying feature engineering and transformation on the one or more numerical variables to extract a plurality of features from the plurality of data sets. The method also includes performing one of a time series forecasting and a regression technique on the one or more numerical variables based on evaluated regression technique. Performing one of the time series forecasting and the regression technique on the one or more numerical variables includes performing the time series forecasting on the one or more numerical variables when the one or more numerical variables of the plurality of data sets are in said time series; running a regression technique on the one or more numerical variables when the one or more numerical variables are not in said time series. The method also includes evaluating and selecting appropriate prediction technique using a regression technique based on a plurality of elements. The method also includes building a prediction model based on chosen prediction technique using one of the time series forecasting and the regression technique. The method also includes scoring the prediction model based on the performed time series forecasting or regression technique. The method also includes predicting the prediction model based on an obtained score.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
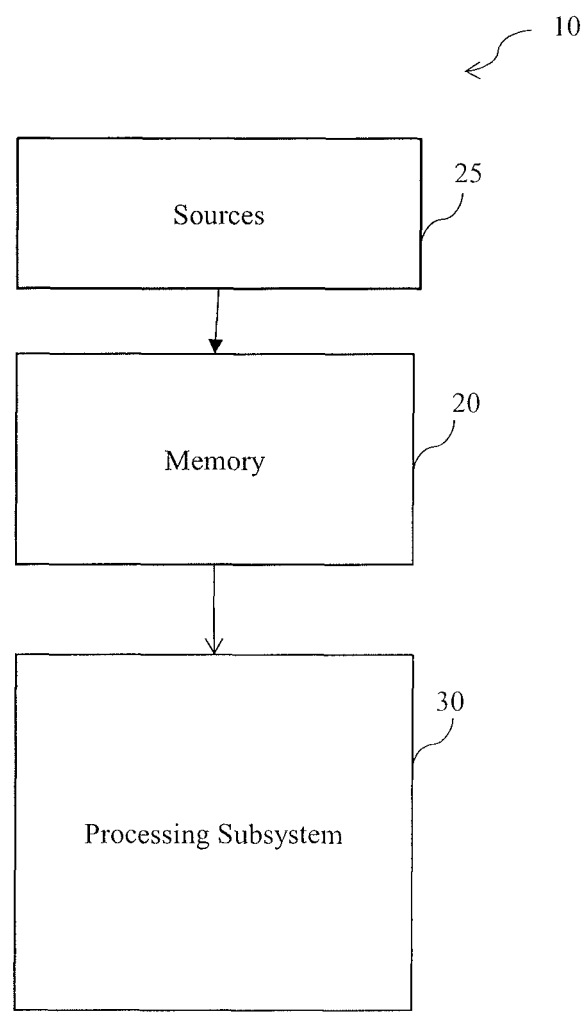
FIG. 1 is a block diagram representation of system to build and score predictive model for numerical attributes in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relates to system and method to build and score predictive model for numerical attributes are provided. The system includes a memory. The memory is configured to store a plurality of data sets acquired from one or more sources. The system also includes a processing subsystem operatively coupled to the memory. The processing subsystem is configured to select one or more numerical variables from the plurality of data sets based on a plurality of parameters, wherein the plurality of parameters includes at least one of a use case, a statistical influence and a previous predictive sample. The processing subsystem is also configured to apply feature engineering and transformation on the one or more numerical variables to extract a plurality of features from the plurality of data sets. The processing subsystem is also configured to perform one of a time series forecasting and a regression technique on the one or more numerical variables based on the plurality of features extracted. Performing one of the time series forecasting and the regression technique on the one or more numerical variables includes performing the time series forecasting on the one or more numerical variables when the one or more numerical variables of the one or more numerical variables are in said time series; running a regression technique on the one or more numerical variables when the one or more numerical variables are not in said time series. The processing subsystem is also configured to evaluate and select appropriate prediction technique using a regression technique based on a plurality of elements. The processing subsystem is also configured to build a prediction model based on chosen prediction technique using one of the time series forecasting and the regression technique. The processing subsystem is also configured to score the prediction model based on performed one of the time series forecasting and the regression technique. The processing subsystem is also configured to predict the prediction model based on an obtained score.

FIG. 1 is a block diagram representation of a system to build and score predictive model for numerical attributes in accordance with an embodiment of the present disclosure. The system (10) includes a memory (20). The memory (20) is configured to store a plurality of data sets acquired from one or more sources (25). In one embodiment, the memory (20) may be a random-access memory (RAM), a read only memory (ROM), a cache memory or a flash memory. In one exemplary embodiment, the plurality of data sets may be acquired from at least one of a web, a manual entry of data, a local data set, an internal storage, an external storage and an experimental data set. In such embodiment, the plurality of data may be a plurality of structured data, a plurality of unstructured data or a plurality of semi-structured data. In one exemplary embodiment, the plurality of data sets may include one or more numerical variables or one or more categorical variables.

The system (10) also includes a processing subsystem (30) operatively coupled to the memory (20). The processing subsystem (30) is configured to select one or more numerical variables from the plurality of data sets based on a plurality of parameters. Further, the plurality of parameters includes at least one of a use case, a statistical influence and a previous predictive sample. In one embodiment, the one or more numerical variables may be manually selected by a user from the plurality of data sets. In another embodiment, the processing subsystem (30) may select the one or more numerical variables from the plurality of data sets based on a pre-defined set of instructions. In another embodiment, the one or more numerical variables may be selected by the processing subsystem (30) from at least one of the use case, the statistical influence and the previous predictive sample.

The processing subsystem (30) is also configured to apply feature engineering and transformation on the one or more numerical variables to extract a plurality of features from the plurality of data sets. As used herein, feature engineering is the process of using domain knowledge of the data to create features that make one or more machine learning models work. In one embodiment, the transformation may be applied on the one or more numerical variables based on the use case, a data quality, a data type and a data volume to extract the plurality of features from the plurality of data sets. As used herein, the machine learning model is defined as a model built within a computer system using artificial intelligence which often adopts statistical techniques and computational learning theory in order to perform at least one said task.

The processing subsystem (30) is also configured to perform one of a time series forecasting and a regression technique on the one or more numerical variables based on the plurality of features extracted. As used herein, the time series is defined as a series of values of a quantity which is obtained at successive times having equal intervals of time. Also, time series forecasting is defined as a method for analysing data which are in time series format in order to extract one or more characteristics from the data.

Furthermore, performing the time series forecasting on the one or more numerical variables includes performing the time series forecasting on the one or more numerical variables when the one or more numerical variables of the plurality of data sets are in said time series. In one exemplary embodiment, if the one or more numerical variables are in time series, the processing subsystem (30) may perform the time series forecasting on the one or more numerical variables by evaluating a trend, a previous history, a current scenario and the like.

Also, if the one or more numerical variables are not in time series, the processing subsystem (30) runs a regression technique on the one or more numerical variables of the plurality of data sets. In one embodiment, the regression technique may be run on the one or more numerical variables which are not in time series by selecting the appropriate machine learning model. As used herein, the term 'regression technique' is defined as a technique in statistical modelling which includes a set of statistical processes for estimating one or more relationships among the one or more variables.

The processing subsystem (30) is also configured to evaluate and select appropriate prediction technique using a regression technique based on a plurality of elements. In one embodiment, the plurality of elements may include at least one of a data quantity, a data volume, a computational resource, a data type, a use case, a plurality of features, a plurality of model performance and a historical model. In such embodiment, the processing subsystem (30) may evaluate a right technique based on the plurality of elements to select the right prediction method. In one specific embodiment, the prediction technique may correspond to a machine learning technique.

The processing subsystem (30) is also configured to build a prediction model based on chosen prediction technique using one of the time series forecasting and the regression technique. In one exemplary embodiment, upon selecting the right prediction method, the built prediction model may be split into training prediction model and a test prediction model. Further, the processing subsystem (30) may use the training prediction model for self-learning. Upon self-learning of the training prediction model, the processing subsystem (30) tests the training prediction model for accuracy of the same. Furthermore, if the training prediction model matches an accuracy criterion, the built prediction model may be scored by the processing subsystem (30) automatically to predict the one or more numerical variables. In such embodiment, the accuracy criterion may be mentioned by the user or may be pre-defined and set within the processing subsystem (30). In a condition, when the training prediction model do not match with the accuracy criterion, the built prediction model may be further modified and built using the prediction method to match the accuracy criteria on order to score and predict the one or more numerical variables.

Furthermore, the processing subsystem (30) is also configured to score the built prediction model based on performed one of the time series forecasting and the regression technique. Referring back to the above mentioned embodiment, the built prediction model may be scored upon matching the accuracy criteria. The processing subsystem (30) is also configured to predict the one or more numerical variables based on an obtained score. In one embodiment, the processing subsystem (30) may predict the one or more numerical variables using one or more technique. In such embodiment, the one or more techniques may be a regression technique, a basic statistic or a similar technique.

In a further embodiment, the system (10) may further include a display device operatively coupled to the processing subsystem (30). The display device may be configured to present the scored and predicted result of the built prediction model in one or more forms. In one exemplary embodiment, the display device may be a display on a hand-held device such as a mobile phone, a tablet, a laptop or a desktop. Further, the scored and predicted result of the built prediction model may be in a form of a graph, a chart, a table or an insight. In such embodiment, the insight may be a textual insight in a natural language.

Figure 2:
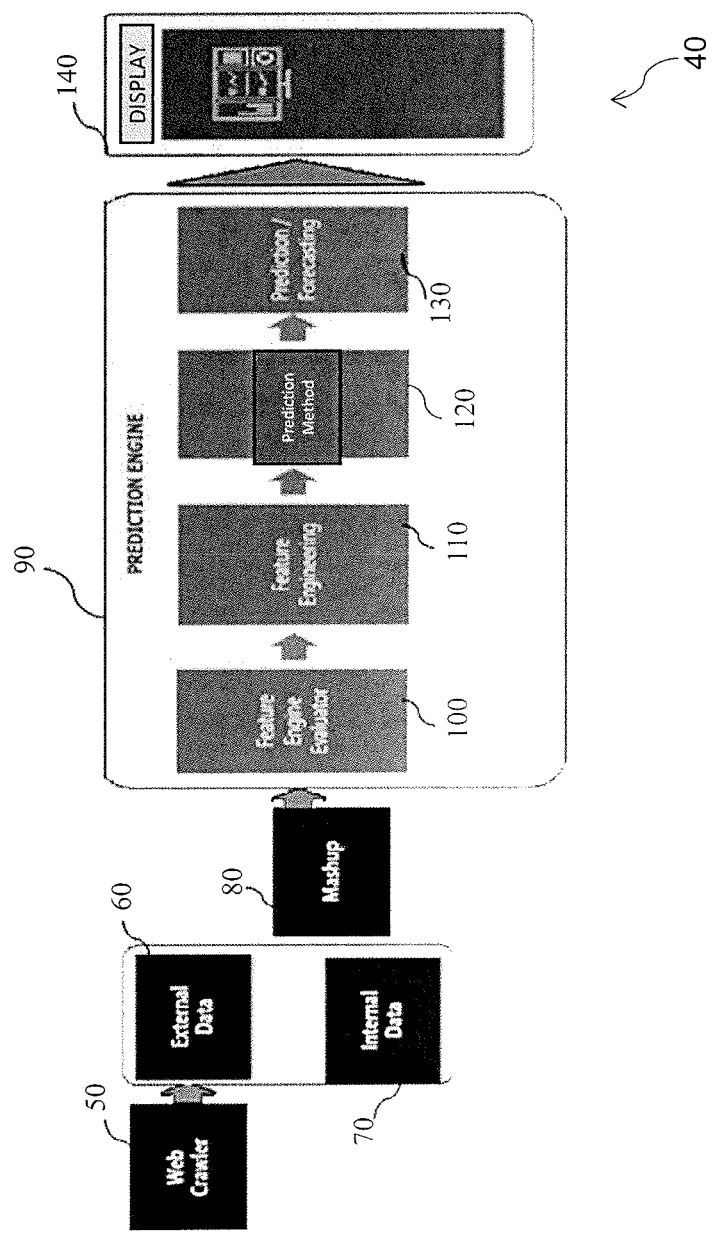
FIG. 2 is a schematic representation of an exemplary embodiment of the system to build and score predictive model for numerical attributes of FIG. 1 in accordance with an embodiment of the present disclosure.

FIG. 2 is a schematic representation (40) of an exemplary embodiment of the system to build and score predictive model for numerical attributes of FIG. 1 in accordance with an embodiment of the present disclosure. A memory (not shown) of the system (40) may mash up (80) one or more external data sets (60) and one or more internal data sets (70) to generate the plurality of data sets. The one or more external data sets (60) is obtained from a web crawler (50). Further, the one or more internal data sets (70) is obtained from a plurality of already existing data set or a plurality of previously verified data set which may be present in the memory. Further, the plurality of data sets may be transmitted to a processing subsystem (not shown) to pre-process the plurality of data sets. On processing the plurality of data sets, the one or more numerical variables is selected by the processing subsystem based on the plurality of parameters. The system (40) includes a prediction engine (90) located within the processing subsystem.

Furthermore, the one or more numerical variables selected by the processing subsystem is subjected to a feature engine evaluator (100) which is located within the prediction engine (90). The feature engine evaluator (100) enhances quality of the one or more numerical variables. Moreover, the one or more numerical variables featured in time series are selected based on the use case, the statistical influence and the previously predictive sample.

On selecting the one or more numerical variables, feature engineering (110) and transformation are applied on the one or more numerical variables to extract the plurality of features. The prediction engine (90) performs one of a time series forecasting and a regression technique on the one or more numerical variables based on the plurality of features. The prediction engine (90) further evaluates the regression technique to select a right prediction method (120) based on the plurality of elements. Furthermore, based on the prediction method selected, a prediction model is built. Consequently, the built prediction model gets scored by the prediction engine (90) based on the performed time series forecasting and an evaluated regression technique.

Based on the score generated by the prediction engine (90) for the built prediction model, one or more characteristics of the built prediction model is predicted (130). Also, the prediction result of the built prediction model is displayed on the display device (140) of the system (40).

Furthermore, the system (40) which includes the memory and the processing subsystem of FIG. 2 is substantially similar to a system (10) which includes a memory (20) and a processing subsystem (30) of FIG. 1.

Figure 3:
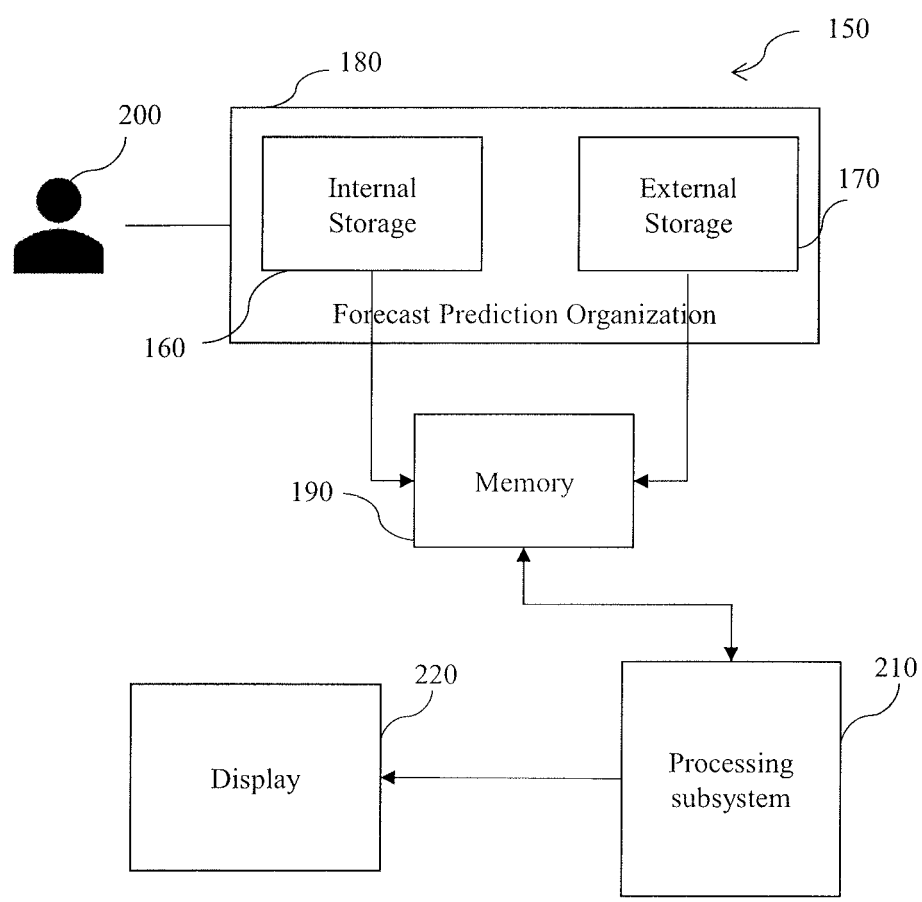
FIG. 3 is a block diagram representation of an exemplary embodiment of a system to build and score predictive model for numerical attributes associated with weather prediction of FIG. 1 in accordance with an embodiment of the present disclosure.

FIG. 3 is a block diagram representation of an exemplary embodiment of a system to build and score predictive model for numerical attributes associated with weather prediction of FIG. 1 in accordance with an embodiment of the present disclosure. The system (150) acquires a plurality of data sets associated to weather forecast. The plurality of data sets is acquired from an external source (170) and an internal source (160) of a forecast prediction organization (180). On acquiring the plurality of data sets from different sources, the plurality of data sets is mashed and is stored in a memory (190) for further scoring and prediction of the weather within a pre-defined geographical location.

Furthermore, as a user (200) selects or chooses one or more numerical variables for prediction based on a plurality of parameters such as a use case, a statistical influence and a previous predictive sample, a processing subsystem (210) executes a relevant statistical model to predict one or more future values of the chosen one or more numerical variables.

Consequently, the one or more numerical variables will be transmitted to a feature engineering engine to apply feature engineering and transformation on the one or more numerical variables. Furthermore, based on the use case, data quality, data type, data volume of the built mode, a relevant transmission is applied on the one or more numerical variables to extract a plurality of features. Upon extracting the plurality of features, the processing subsystem (210) comprehends the one or more numerical variables with time series. Consequently, the one or more numerical variables which are in time series are subjected to time series forecasting by evaluating trend, seasonality and one or more cyclic components of the pre-defined geographical location to forecast the expected values of the built model for a pre-set timeframe. In addition, for the one or more variables which are not in time series are subjected to the regression technique by the processing subsystem (210) using the statistical model for estimation of the one or more numerical variables.

Furthermore, the statistical model chooses the right technique to select a right prediction method based on a data quality, data volume, computational resources required, data type, the use case, historical model performance. Upon selecting the right prediction method, the processing subsystem (210) builds a prediction model. Furthermore, the processing subsystem (210) upon building the prediction model, splits the built prediction model into a training model and a test model. The processing subsystem (210) uses the training model for self-learning. Consequently, the processing subsystem (210) test the training model for accuracy with respect to a pre-defined accuracy rate. Furthermore, if the training model matches the pre-defined accuracy rate, the processing subsystem (210) scores the built prediction model and generated a score to predict the weather forecast of the pre-defined geographical area in pre-set time frame.

Subsequently, based on the generated score, the processing subsystem (210) predicts the one or more numerical variables weather forecast for the pre-defined geographical area. In addition, the prediction of the weather forecast is generated in a form of a natural language using one or more narrative engines. Consequently, one or more charts and one or more tables are created on a display device which is operatively coupled to the processing subsystem. Also, the processing subsystem (210) tracks the performance of the built prediction model and alerts the user if any detonation in accuracy is found. In such a situation, the processing subsystem (210) adjust the plurality of parameters based on a feedback generated. The feedback is essentially a difference between actual results of the weather forecast and the predicted results of the weather forecast of the pre-defined geographical location.

Further, the predicted results are displayed on a display (220) which is operatively coupled to the processing subsystem (210). The predicted result is displayed in a form of chart and table on the display (220). In addition, the predicted results are stored in the memory (190).

Furthermore, the sources (180), the memory (190) and the processing subsystem (210) are substantially similar to sources (25), a memory (20) and a processing subsystem (30) of FIG. 1.

Figure 4:
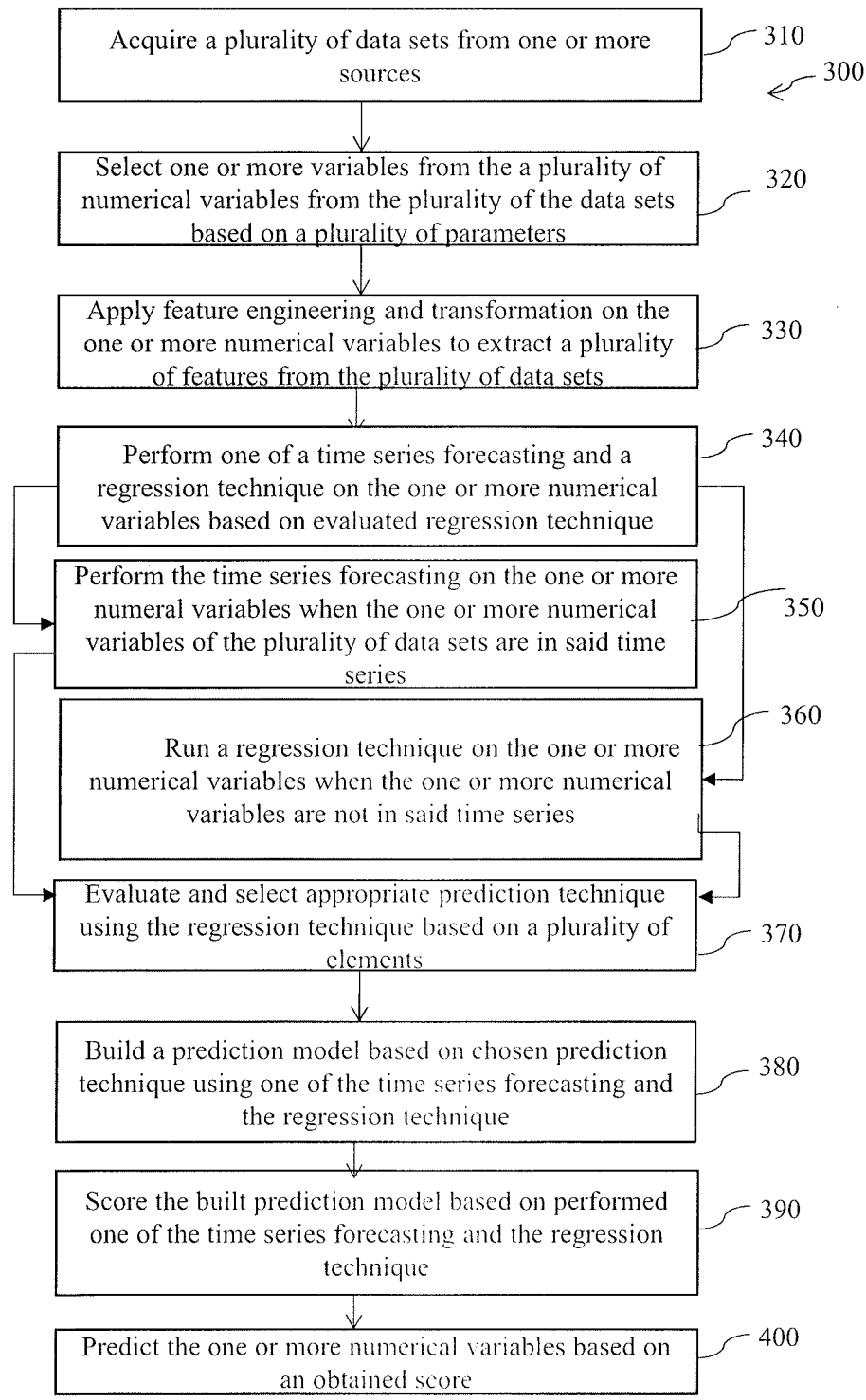
FIG. 4 is a flow chart representing steps involved in a method for building and scoring predictive model for numerical attributes in accordance with an embodiment of the present disclosure.

FIG. 4 is a flow chart representing steps involved in method for building and scoring predictive model for numerical attributes in accordance with an embodiment of the present disclosure. The method (300) includes acquiring a plurality of data sets from one or more sources in step 310. In one embodiment, acquiring the plurality of data sets from the one or more sources may include acquiring the plurality of data sets from at least one of a web, a manual entry of data, a local data set, an internal storage, an external storage and an experimental data set.

The method (300) also includes selecting one or more numerical variables from the plurality of data sets based on a plurality of parameters in step 320. The plurality of parameters includes at least one of a use case, a statistical influence and a previous predictive sample.

The method (300) also includes applying feature engineering and transformation on the one or more numerical variables to extract a plurality of features from the plurality of data sets in step 330. In one embodiment, applying transformation on the one or more numerical variables may include applying the transformation on the one or more numerical variables based on the use case, a data quality, a data type and a data volume for extracting the plurality of features from the plurality of data sets.

The method also (300) includes performing one of a time series forecasting and a regression technique on the one or more numerical variables based on evaluated regression technique in step 340. Furthermore, performing the time series forecasting on the one or more numerical variables includes performing the time series forecasting on the one or more numerical variables when the one or more numerical variables of the plurality of data sets are in said time series in step 350.

In addition, performing the time series forecasting on the one or more numerical variables also includes running a regression technique on the one or more numerical variables when the one or more numerical variables are not in said time series in step 360. In one embodiment, performing the time series forecasting on the one or more numerical variables may include performing the time series forecasting on the one or more numerical variables by evaluating a trend, a previous history, a current scenario and the like.

The method (300) also includes evaluating and selecting appropriate prediction technique using a regression technique based on a plurality of elements in step 370. In one embodiment, evaluating the regression technique based on the plurality of elements may include evaluating the regression technique based on at least one of a data quantity, a data volume, a computational resource, a data type, a use case, a plurality of features, a plurality of model performance and a historical model.

The method (300) also includes building a prediction model based on chosen prediction technique using one of the time series forecasting and the regression technique in step 380. In one embodiment, building the prediction model may include building the prediction model based on the plurality of parameters may include building the prediction model based on at least one of the use case, the statistical influence and the previous predictive sample.

Furthermore, the method (300) also includes scoring the built prediction model based on the performed one of the time series forecasting and the regression technique in step 390. In one embodiment, scoring the built prediction model may include splitting the built prediction model into a training prediction model and a test prediction model. Furthermore, the method (300) may include learning the training prediction model using the prediction method. Scoring the built prediction model may further include testing an accuracy of the learnt prediction model for matching an accuracy of the learnt prediction model with the accuracy level of the test prediction model. Consequently, scoring the tested and matched prediction model.

The method (300) also includes predicting the built prediction model based on an obtained score in step 400. In one embodiment, predicting the built prediction model based on the obtained score may include predicting one or more characteristics of the built prediction model based on the obtained score.

In one embodiment, the method (300) may further include presenting the scored and predicted result of the built prediction model in one or more forms. In one embodiment, presenting the scored and predicted result of the built prediction model in the one or more forms may include presenting the scored and predicted result of the built prediction model in at least one of a graph, a chart, a table or an insight. In such embodiment, the insight may be a textual insight in a natural language. In further embodiment, the method may further include storing the scored and predicted prediction model.

Various embodiments of the present disclosure described above enable the automatic scoring and prediction of the prediction model by using the prediction method. Also, the scored and predicted prediction model is presented in various forms based on the type of built prediction model.

In addition, the system automatically craws the plurality of external data set from web for analysis. The system also provides end-to-end functionalities and features that are required in building, developing and maintaining statistical and machine learning models.

The system selects machine learning model, methodology and features which may enable the user to easily build and manage advanced predictive modelling solutions. The system also achieves data integration and data pre-processing. The system also integrates the plurality of internal data set and the plurality of external data sets for prediction and scoring of the received plurality of data sets by automatically crawling through the external sources.

Various embodiments of the system described above also enable the system to choose a right prediction model and the feature engineering model based on the data type, the volume, the variety, the quality and the use case which are in time series using the machine learning model.

The system also adjusts the plurality if parameters and the variables based on the feedback such as a difference between actual and predicted forecast result. Also, the system tracks and monitors the performance of the built prediction model. The system also produces insights of the predicted prediction model in very short time which makes the system very efficient.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

What is claimed is:

1. A system to build and score predictive model for numerical attributes comprising:
   a processing subsystem; and
   a memory coupled to the processing subsystem, wherein the memory comprises a set of program instructions, configured to be executed by the processing subsystem, wherein the processing subsystem is configured to:
   select one or more numerical variables from a plurality of data sets that are acquired from one or more sources, based on a plurality of parameters, wherein the plurality of parameters comprises at least one of a use case, a statistical influence and a previous predictive sample;
   extract a plurality of features from the plurality of data sets based on feature engineering and transformation processes applied on the one or more numerical variables;
   perform one of a time series forecasting and a regression technique on the one or more numerical variables based on the plurality of features extracted, wherein performing one of the time series forecasting and the regression technique on the one or more numerical variables comprises:
   performing the time series forecasting on the one or more numerical variables when the one or more numerical variables of the plurality of data sets are in a time series;
   perform the regression technique on the one or more numerical variables when the one or more numerical variables of the plurality of data sets are not in said time series;
   evaluate and select a prediction technique using the regression technique based on a plurality of elements, wherein the plurality of elements comprises at least one of a data quantity, a data volume, a computational resource, a data type, a use case, a plurality of features, a plurality of model performance and a historical model;

generate a prediction model based on the selected prediction technique using one of the time series forecasting and the regression technique, wherein the generated prediction model is split into a training prediction model for self-learning and a test prediction model, wherein the training prediction model is tested for accuracy upon self-learning of the training prediction model;

compare the training prediction model with an accuracy criteria;

calculate a score for the generated prediction model when the training prediction model matches with the accuracy criteria by automatically crawling through external sources;

predict the one or more numerical variables based on the calculated score for the generated prediction model; and present a predicted result of the generated prediction model in one or more forms, wherein the one or more forms comprise a graph, a chart, a table or an insight wherein, the insight is a textual insight in a natural language.

2. The system of claim 1, wherein the plurality of data sets is acquired from at least one of a web, a manual entry of data, a local data set, an internal storage, an external storage and an experimental data set.

3. A method for scoring and predicting numerical data comprising:

acquiring, by a processing subsystem, a plurality of data sets from one or more sources;

selecting, by the processing subsystem, one or more numerical variables from the plurality of data sets based on a plurality of parameters, wherein the plurality of parameters comprises at least one of a use case, a statistical influence and a previous predictive sample;

extracting, by the processing subsystem, a plurality of features from the plurality of data sets based on feature engineering and transformation processes applied on the one or more numerical variables;

performing, by the processing subsystem, one of a time series forecasting and a regression technique on the one or more numerical variables based on the plurality of features extracted, wherein performing the time series forecasting on the one or more numerical variables comprises:

performing, by the processing subsystem, the time series forecasting on the one or more numerical variables when the one or more numerical variables of the plurality of data sets are in a time series;

performing, by the processing subsystem, the regression technique on the one or more numerical variables when the one or more numerical variables of the plurality of data sets are not in said time series;

evaluating and selecting, by the processing subsystem, a prediction technique using the regression technique based on a plurality of elements, wherein the plurality of elements comprises at least one of a data quantity, a data volume, a computational resource, a data type, a use case, a plurality of features, a plurality of model performance and a historical model;

generating, by the processing subsystem, a prediction model based on the selected prediction technique using one of the time series forecasting and the regression technique, wherein the generated prediction model is split into a training prediction model for self-learning and a test prediction model, wherein the training prediction model is tested for accuracy upon self-learning of the training prediction model;

comparing, by the processing subsystem, the training prediction model with an accuracy criteria;

calculating, by the processing subsystem, a score for the generated prediction model when the training prediction model matches with the accuracy criteria by automatically crawling through external sources;

predicting, by the processing subsystem, the one or more numerical variables based on the calculated score for the generated prediction model; and presenting, by a processing subsystem, a predicted result of the generated prediction model in one or more forms, wherein the one or more forms comprise a graph, a chart, a table or an insight wherein, the insight is a textual insight in a natural language.

4. The method of claim 3, wherein the plurality of data sets is acquired from at least one of a web, a manual entry of data, a local data set, an internal storage, an external storage and an experimental data set.

* * * * *